US012323941B2

United States Patent
Qi

(10) Patent No.: US 12,323,941 B2
(45) Date of Patent: Jun. 3, 2025

(54) ANGLE-BASED POSITIONING AND MEASUREMENT IN A TELECOMMUNICATION SYSTEM

(71) Applicant: Samsung Electronics Co., Ltd., Suwon-si (KR)

(72) Inventor: Yinan Qi, Staines (GB)

(*) Notice: Subject to any disclaimer, the term of this patent is extended or adjusted under 35 U.S.C. 154(b) by 531 days.

(21) Appl. No.: 17/250,932

(22) PCT Filed: Sep. 30, 2019

(86) PCT No.: PCT/KR2019/012750
§ 371 (c)(1),
(2) Date: Mar. 29, 2021

(87) PCT Pub. No.: WO2020/067840
PCT Pub. Date: Apr. 2, 2020

(65) Prior Publication Data
US 2022/0007325 A1 Jan. 6, 2022

(30) Foreign Application Priority Data

Sep. 28, 2018 (GB) ...................... 1815891

(51) Int. Cl.
*H04W 64/00* (2009.01)
*G01S 5/02* (2010.01)
(Continued)

(52) U.S. Cl.
CPC ......... *H04W 64/00* (2013.01); *G01S 5/02585* (2020.05); *G01S 5/04* (2013.01); *G01S 5/08* (2013.01); *H04W 8/24* (2013.01)

(58) Field of Classification Search
CPC .......... H04W 64/00; H04W 8/24; G01S 5/02; G01S 5/04; G01S 5/08
See application file for complete search history.

(56) References Cited

U.S. PATENT DOCUMENTS

| 10,412,611 | B2 | 9/2019 | Park et al. |
| 11,228,867 | B2* | 1/2022 | Kumar ................... H04L 5/005 |

(Continued)

FOREIGN PATENT DOCUMENTS

| CN | 102630390 A | 8/2012 |
| CN | 103314613 A | 9/2013 |

(Continued)

OTHER PUBLICATIONS

International Search Report and Written Opinion of the International Searching Authority in connection with International Application No. PCT/KR2019/012750 dated Jan. 20, 2020, 9 pages.

(Continued)

*Primary Examiner* — Khawar Iqbal

(57) ABSTRACT

The disclosure relates to a pre-5$^{th}$-Generation (5G) or 5G communication system to be provided for supporting higher data rates Beyond 4$^{th}$-Generation (4G) communication system such as long term evolution (LTE). Disclosed is a method of determining a User Equipment, UE, location wherein the UE is in communication with at least two base stations (gNB) of a telecommunication network, comprising the steps of: determining at least one of: a) Angle of Arrival, AoA, of a signal from the UE at each of the at least two gNBs; b) Angle of Departure, AoD, of a signal from each of the at least two gNBs; c) AoA of a signal from each of the at least two gNBs at the UE; and d) AoD of a signal from the UE at each of the at least two gNBs; and determining the UE position on the basis thereof.

6 Claims, 6 Drawing Sheets

(51) Int. Cl.
*G01S 5/04* (2006.01)
*G01S 5/08* (2006.01)
*H04W 8/24* (2009.01)

(56) References Cited

U.S. PATENT DOCUMENTS

| | | | |
|---|---|---|---|
| 11,588,563 B2* | 2/2023 | Sadiq | H04B 7/0632 |
| 11,646,921 B2* | 5/2023 | Akkarakaran | H04W 64/00 |
| | | | 370/329 |
| 11,696,122 B2* | 7/2023 | Edge | H04W 64/00 |
| | | | 726/4 |
| 2011/0205108 A1 | 8/2011 | Boyer et al. | |
| 2012/0162012 A1 | 6/2012 | Marzouki et al. | |
| 2012/0302254 A1 | 11/2012 | Charbit et al. | |
| 2014/0225770 A1 | 8/2014 | Riley et al. | |
| 2016/0242135 A1* | 8/2016 | McLaughlin | H04B 1/71637 |
| 2017/0142595 A1 | 5/2017 | Ljung et al. | |
| 2017/0332192 A1 | 11/2017 | Edge | |
| 2019/0037529 A1* | 1/2019 | Edge | G01S 1/0428 |
| 2020/0088869 A1* | 3/2020 | Pefkianakis | H04W 64/006 |
| 2020/0408872 A1* | 12/2020 | Wigren | G01S 5/02695 |
| 2022/0200668 A1* | 6/2022 | Wang | H04B 7/0639 |
| 2022/0272014 A1* | 8/2022 | Bhushan | G01S 13/825 |
| 2022/0349981 A1* | 11/2022 | Akkarakaran | G01S 5/0221 |
| 2022/0377701 A1* | 11/2022 | Edge | H04W 24/10 |
| 2022/0417890 A1* | 12/2022 | Opshaug | H04B 7/0695 |
| 2023/0031072 A1* | 2/2023 | Bahr | H04W 8/18 |
| 2024/0023059 A1* | 1/2024 | Edge | H04B 7/0452 |

FOREIGN PATENT DOCUMENTS

| | | |
|---|---|---|
| CN | 104995863 A | 10/2015 |
| CN | 107439044 A | 12/2017 |
| WO | 2018069208 A1 | 4/2018 |
| WO | 2018169659 A1 | 9/2018 |

OTHER PUBLICATIONS

Combined Search and Examination Report dated Aug. 5, 2020 in connection with United Kingdom Application No. GB1914038.3, 6 pages.
European Patent Office, "Supplementary European Search Report" issued Nov. 25, 2021, in connection with European Patent Application No. 19864732.3, 7 pages.
Communication pursuant to Article 94(3) EPC dated Nov. 22, 2023, in connection with European Application No. 19864732.3, 4 pages.
The First Office Action dated Nov. 29, 2023, in connection with Chinese Application No. 201980064184.9, 23 pages.
Summons to attend oral proceedings pursuant to Rule 115(1) EPC dated Oct. 10, 2024, in connection with European Application No. 19864732.3, 6 pages.
Notice of Preliminary Rejection dated Dec. 11, 2024, in connection with Korean Patent Application No. 10-2021-7012931, 6 pages.
Notice of Patent Grant dated Mar. 10, 2025, in connection with Korean Application No. 10-2021-7012931, 3 pages.
Decision to refuse a European Patent application dated Apr. 22, 2025, in connection with European Application No. 19864732.3, 12 pages.

* cited by examiner

[Fig. 1]
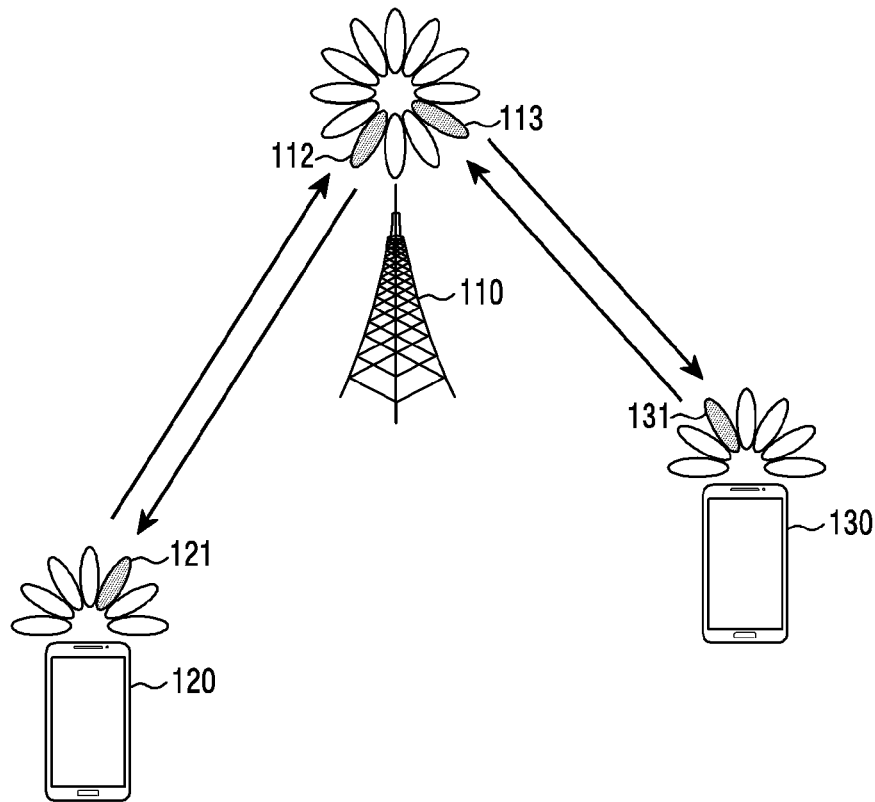
[Fig. 2]
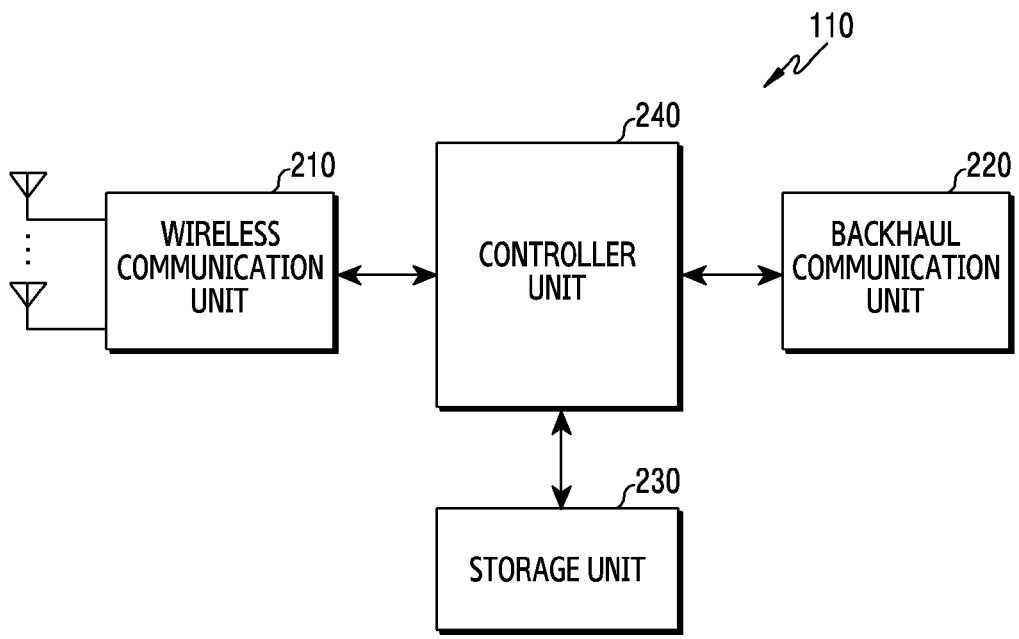

[Fig. 3]
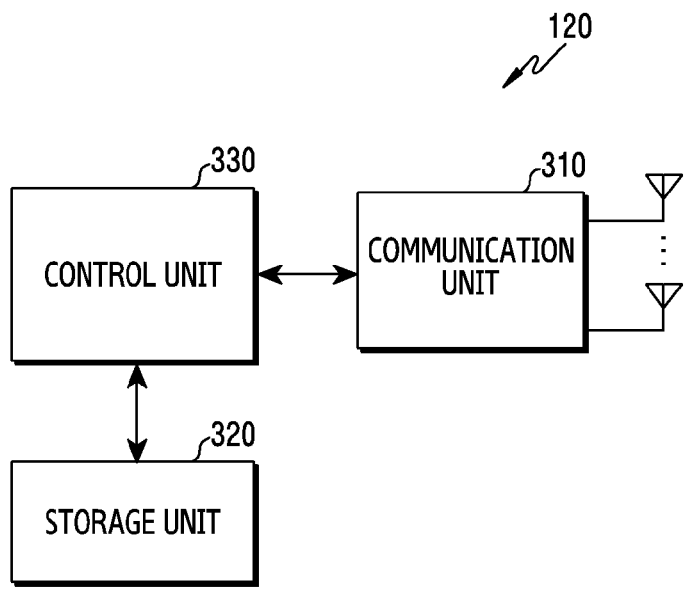
[Fig. 4]
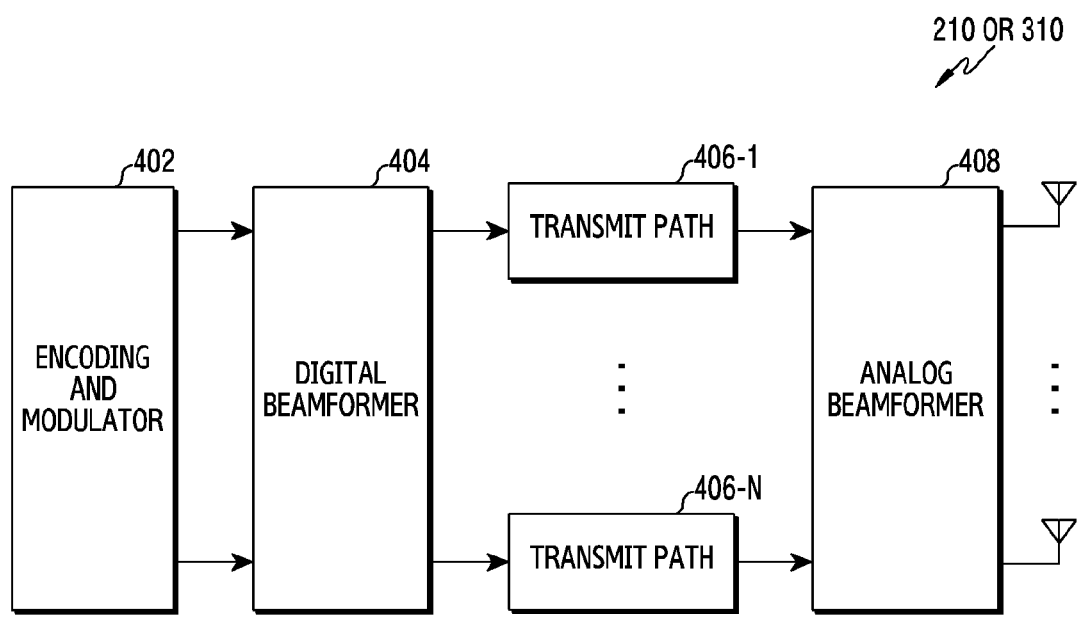

[Fig. 5]
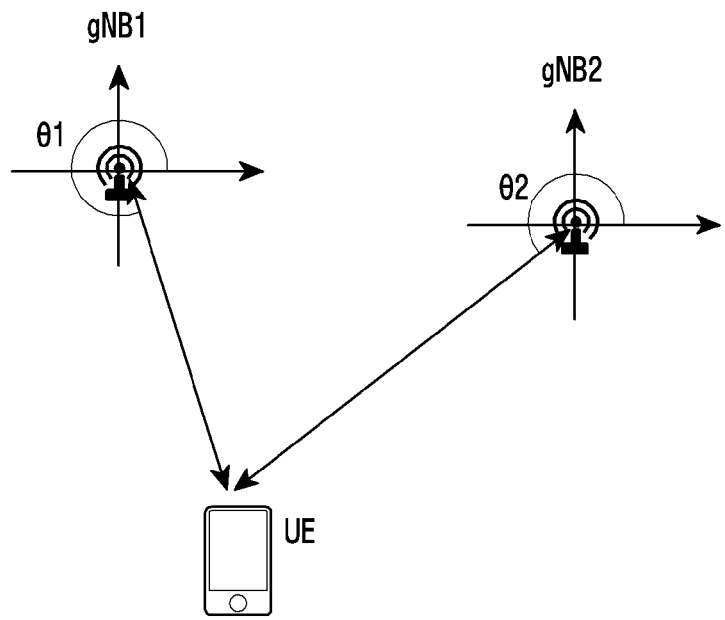
[Fig. 6]
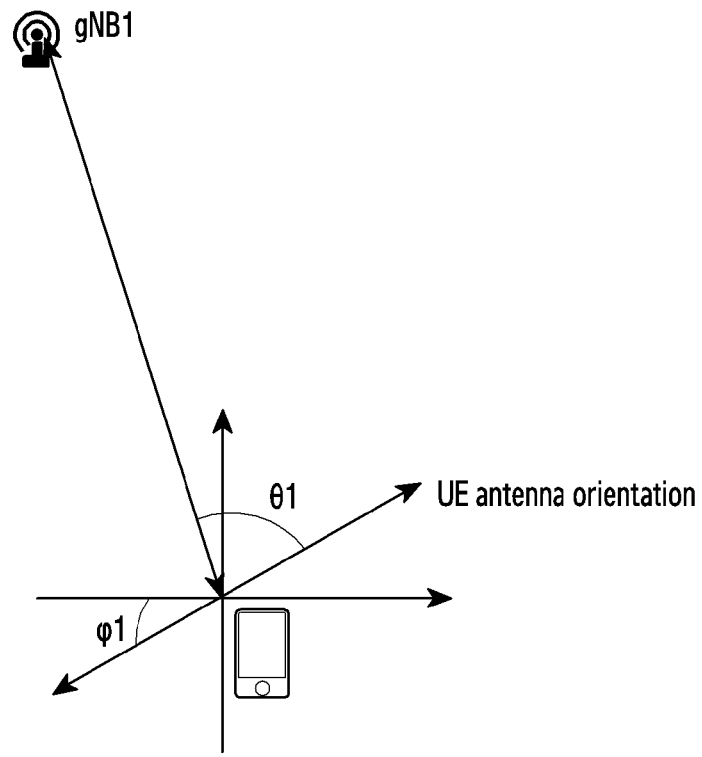

[Fig. 7]
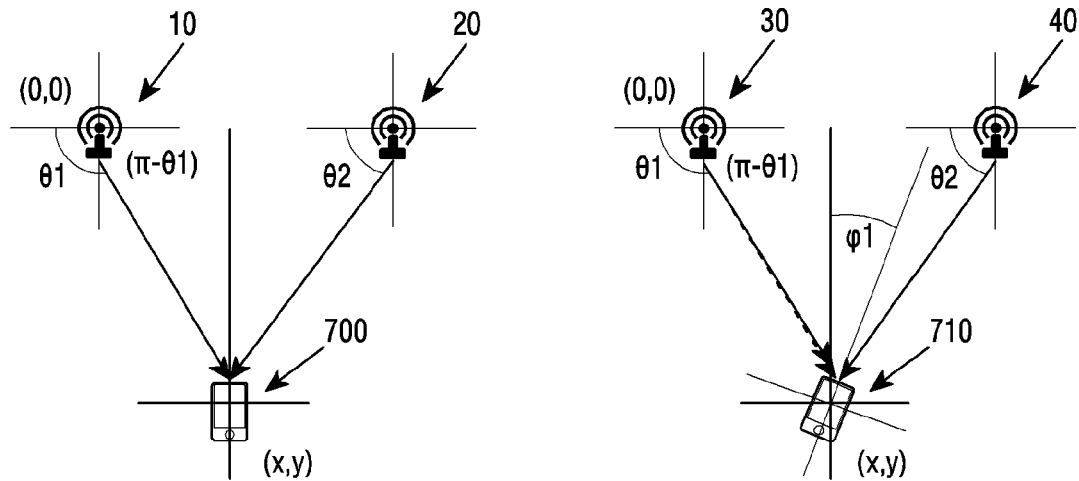
[Fig. 8]
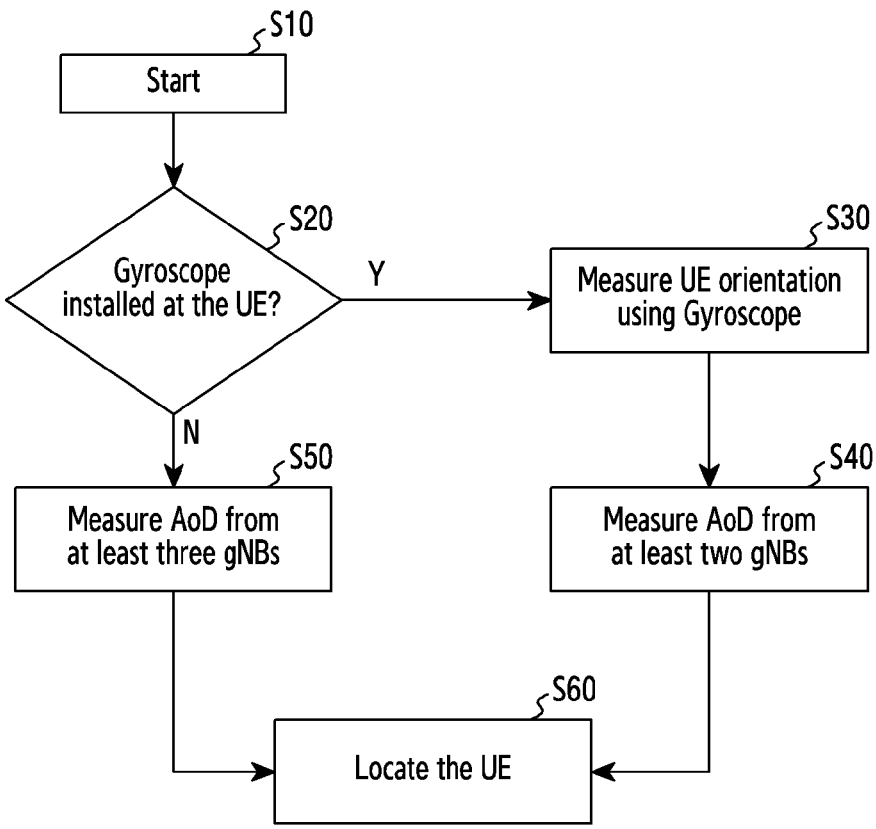

[Fig. 9]
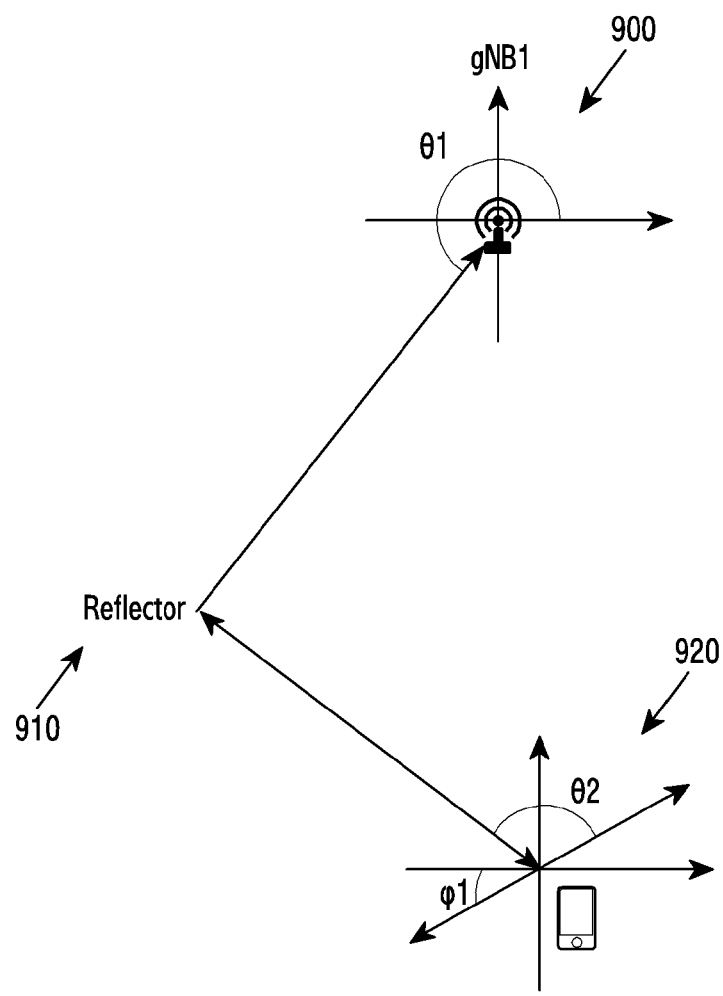

[Fig. 10]
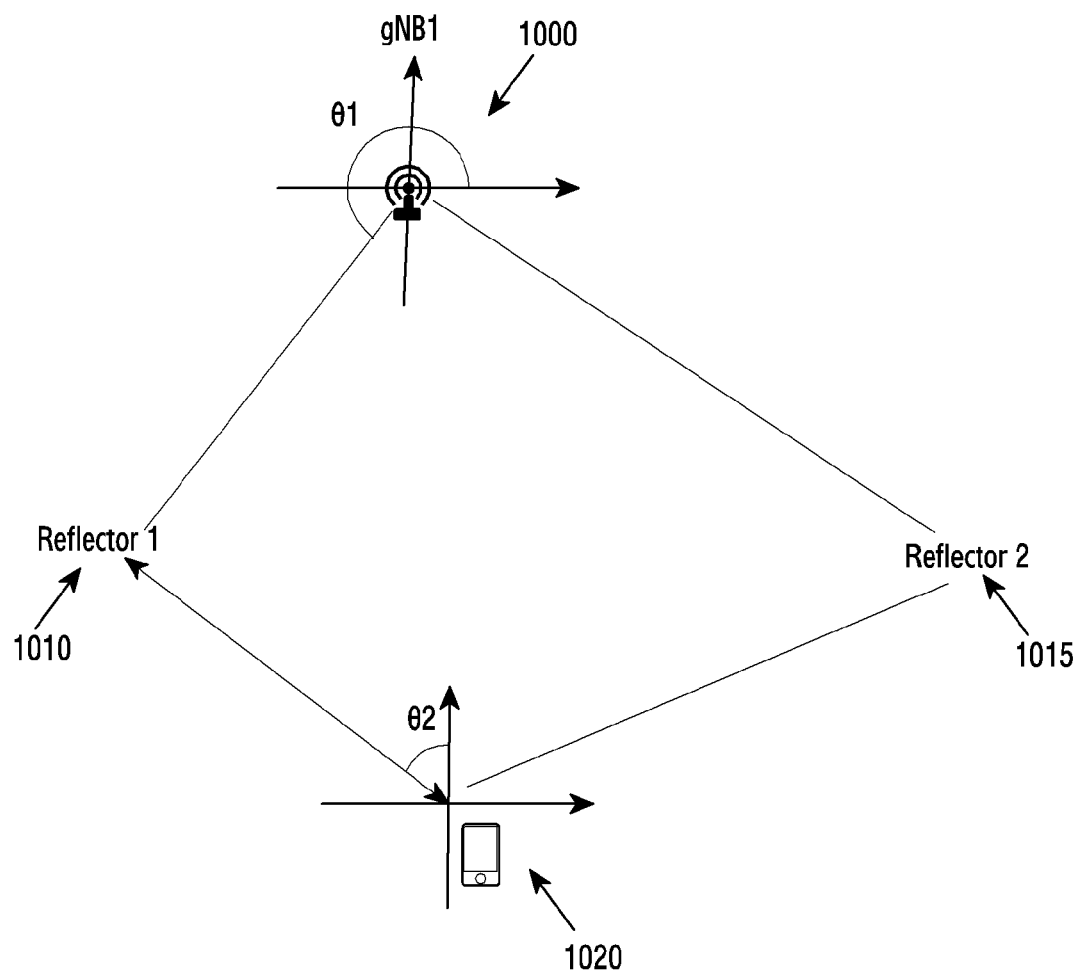

ANGLE-BASED POSITIONING AND MEASUREMENT IN A TELECOMMUNICATION SYSTEM

CROSS-REFERENCE TO RELATED APPLICATIONS

This application is a 371 National Stage of International Application No. PCT/KR2019/012750, filed Sep. 30, 2019, which claims priority to United Kingdom Patent Application No. GB1815891.5, filed Sep. 28, 2018, the disclosures of which are herein incorporated by reference in their entirety.

BACKGROUND

1. Field

The disclosure relates to an angle-based positioning and measurement system in a telecommunication network.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Demand for mobile services is growing rapidly and one of the fastest growing segments is Location Based Services (LBS), primarily driven by two major requirements: emergency services and commercial applications. In response to these needs, second and third generation networks (WCDMA, GSM, CDMA) have added support for several positioning technologies, which vary in their accuracy and Time to First Fix (TTFF) performance. 3GPP Release 9 for LTE defines support for positioning technologies: Extended Cell ID (ECID), Assisted Global Navigation Satellite System (A-GNSS), Observed Time Different Of Arrival (OT-DOA) and LTE Positioning Protocol (LPP), a new positioning protocol. A new reference signal, i.e., positioning reference signal (PRS) has been defined in LTE. Further in Release-11, Uplink Observed Time Different of Arrival (UTDOA) has been adopted using SRS measurement. 3GPP Release-15 defines support for some RAT-independent positioning techniques, such as Real Time Kinematic (RTK) GNSS, to improve the accuracy of LTE positioning.

SUMMARY

Embodiments of the disclosure aim to address problems with the prior art, whether mentioned here or not.

According to the disclosure there is provided an apparatus and method as set forth herein. Other features of the invention will be apparent from the description which follows.

According to the disclosure, there is provided a positioning method based on angle, and/or signal strength, and/or time of arrival, and/or time of arrival difference. Embodiments make use of the corresponding UE capability reporting and measurement procedure and metrics.

According to a first aspect of the disclosure, there is provided a method of determining a User Equipment, UE, location wherein the UE is in communication with at least two base stations (gNB) of a telecommunication network, comprising the steps of: determining at least one of: a) Angle of Arrival, AoA, of a signal from the UE at each of the at least two gNBs; b) Angle of Departure, AoD, of a signal from each of the at least two gNBs; c) AoA of a signal from each of the at least two gNBs at the UE; and d) AoD of a signal from the UE at each of the at least two gNBs; and determining the UE position on the basis thereof.

In an embodiment, for option a) or d), the signal is one of: a reference signal such as SRS, DMRS, PTRS and PRACH; or a data transmission In an embodiment, for option b) or c) the signal is one of: CSI-RS/TRS, DMRS, PTRS and SS.

In an embodiment, for option a) a first of the at least two gNBs signals its AoA to a second of the at least two gNBs, such that the second of the least two gNBs determines the UE location based on the AoA from the first of the at least two gNBs and its own AoA.

In an embodiment, for option b), AoD for each of the at least two gNBs is determined from a precoding matrix and each gNB signals its AoD to the UE along with its own location information such that the UE determines its own location.

In an embodiment, for option c) if the at least two gNBs equals two gNBs, then the UE additionally requires its own orientation.

In an embodiment, the UE acquires its own orientation by means of a sensor, such as a gyroscope, installed in the UE.

In an embodiment, for option c) if the at least two gNBs equals at least three gNBs, the UE does not require its own orientation in order to determine its location.

In an embodiment, for option d) AoD information related to each of the at least two gNBs is sent from the UE to at least one of the at least two gNBs, such that that gNB is able to determine the location of the UE.

In an embodiment, in the event of a reflector in a path between at least one gNB and the UE, one or more further parameters is utilised to determine the UE location.

In an embodiment, the one or more further parameters relates to signal strength, such that a path loss can be determined in connection with a signal passing between the UE and the at least one gNB.

In an embodiment, the one or more further parameters relate to timing advance or Round Trip Time, RTT.

In an embodiment, more than one of options a) to d) are used to determine UE location.

In an embodiment, the certain parameters used for determining UE location are specific to a particular RAT in use and certain other parameters are independent of the particular RAT in use.

In an embodiment, the UE signal to the network a capability report which includes information regarding the UE's ability to perform angle-based positioning.

According to a second aspect of the disclosure, there is provided a UE in communication with at least two gNBs, operable to determine its location on the basis of one or more of Angle of Departure, AoD, of a signal from each of the at least two gNBs or Angle of Arrival, AoA, of a signal from each of the at least two gNBs at the UE.

According to a third aspect of the disclosure, there is provided a gNB in communication with a UE, operable to determine a location of the UE on the basis of Angle of Arrival, AoA, of a signal from the UE at the gNB and at least one other gNB or Angle of Departure, AoD, of a signal from the UE at the gNB and at least one other gNB.

Embodiments of the disclosure utilise, for network-based angle-based positioning, both AoA and AoD based positioning schemes for use within an NR framework.

Embodiments of the disclosure utilise UE-based angle-based positioning, where UE orientation is used for positioning.

Embodiments of the disclosure utilise hybrid positioning, combining angle and other measurements, where not only Line of Sight (LOS), but Non-LOS (NLOS) is supported.

In embodiments of the disclosure, positioning may be based on UE capability, e.g., number of antenna elements at the UE side.

In embodiments of the disclosure, a measurement metric is defined for NR angle-based positioning.

BRIEF DESCRIPTION OF THE DRAWINGS

Although a few preferred embodiments of the disclosure have been shown and described, it will be appreciated by those skilled in the art that various changes and modifications might be made without departing from the scope of the invention.

For a better understanding of the invention, and to show how embodiments of the same may be carried into effect, reference will now be made, by way of example only, to the accompanying diagrammatic drawings in which:

FIG. 1 illustrates a wireless communication system according to an embodiment;

FIG. 2 illustrates a base station in a wireless communication system according to an embodiment;

FIG. 3 illustrates a terminal in a wireless communication system according to an embodiment;

FIG. 4 illustrates a communication unit in a wireless communication system according to an embodiment;

FIG. 5 shows AoA/AoD-based positioning according to an embodiment of the invention;

FIG. 6 shows AoA/AoD-based positioning at the UE side according to an embodiment of the invention; and FIG. 7 shows the effect of UE orientation on positioning;

FIG. 8 shows a flowchart according to an embodiment of the disclosure;

FIG. 9 shows AoA/AoD-based positioning according to an embodiment of the invention; and FIG. 10 shows an arrangement for positioning with 2 reflectors, according to an embodiment of the disclosure.

DETAILED DESCRIPTION

Terms used in the present disclosure are used for describing particular embodiments and are not intended to limit the present disclosure. A singular expression may include a plural expression unless plainly different according to a context or unless explicitly represented otherwise. Further, unless defined otherwise, all the terms used herein, including technical and scientific terms, may have the same meanings as those generally understood by a person skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure, the terms should not be interpreted to exclude the embodiments.

In various embodiments to be described below, a hardware approach may be described as an example. However, it is understood that various embodiments may include a technology using both hardware and software, and various embodiments do not exclude a software-based approach.

Various embodiments provide an apparatus and a method for selecting a beam in a wireless communication system. More specifically, the present disclosure describes a technique for selecting a common beam used for a plurality of carriers in the wireless communication system.

Terms indicating signals, terms indicating signal propagation characteristics (e.g., directivity), terms indicating control information, terms indicating network entities, and terms indicating components of a device, which are used in the following descriptions, are for the sake of explanations. Accordingly, the present disclosure is not limited to the terms to be described, and may use other terms having technically identical or similar meaning.

In this disclosure, to determine whether a specific condition is satisfied or fulfilled, expressions such as "greater than" or "less than" are used by way of example and expressions such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versal), etc.

The present disclosure provides various embodiments using terms used in some communication standards by way of example. Various embodiments may be easily used in or may be applicable to other communication systems.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

FIG. 4 illustrates a communication unit 210 or 310 in a wireless communication system according to an embodiment. FIG. 4 depicts a detailed configuration of the wireless communication unit 210 of FIG. 2 or the communication unit 310 of FIG. 3. More specifically, FIG. 4 depicts components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit (or transmission) paths 406-1 through 406-N, and an analog beamformer 408.

The encoder and modulator 402 performs channel encoding. To perform the channel encoding, at least one of a low density parity check (LDPC) code, a convolution code, and a polar code may be used. The encoder and modulator 402 generates modulation symbols through constellation mapping.

The digital beamformer 404 beamforms a digital signal (e.g., the modulation symbols). To this end, the digital beamformer 404 may multiply or apply beamforming weights to the modulation symbols. Herein, the beamforming weights are used to change a level and a phase of a signal and may be referred to as a precoding matrix or a precoder. The digital beamformer 404 outputs the digital-beamformed modulation symbols to the plurality of transmit paths 406-1 through 406-N. In this case, according to a multiple input multiple output (MIMO) transmission scheme, the modulation symbols may be multiplexed or the same modulation symbols may be fed to the plurality of transmit paths 406-1 through 406-N.

The transmit paths 406-1 through 406-N convert the digital-beamformed digital signals to analog signals. To this end, the transmit paths 406-1 through 406-N each may include an inverse fast Fourier transform (IFFT) operator, a cyclic prefix (CP) adder or inserter, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. To this end, the analog beamformer 408 may multiply or apply the beamforming weights to the analog signals. Herein, the beamforming weights are used to change the level and the phase of the signal. More specifically, the analog beamformer 408 may be variously configured, according to a connection structure between the transmit paths 406-1 through 406-N and the antennas. For example, the transmit paths 406-1 through 406-N each may be connected to one antenna array, or the transmit paths 406-1 through 406-N may be connected to one antenna array. Further, the transmit paths 406-1 through 406-N may be adaptively connected to one antenna array, or may be connected to two or more antenna arrays.

In addition to prior art positioning technologies, new positioning techniques exploiting NR features such as much wider bandwidth and massive number of antenna elements can also be utilised to achieve high positioning accuracy. Angle of Arrival (AoA) measurement accuracy scales with the number of antenna elements at the receiver side. In this sense, an NR base station (gNB) with more antenna elements is expected to provide much higher accuracy. Further, more complex UEs with enhanced hardware can be supported in Fifth Generation (5G), which makes AoA measurement at the UE side possible, where it was generally not in the prior art, primarily due to the limited computational power and facilities available. Essentially, in embodiments of the disclosure, AoA measurement can happen at both sides of the communication link (i.e. at UE or gNB) depending on UE capability, channel reciprocity, etc., and the UE position can potentially be calculated at both sides. Furthermore, such measurement can be combined with other Radio Access Technology (RAT)-dependent measurement such as arrival time difference, or even RAT-independent measurement technology, such as a gyroscope, to further improve positioning accuracy or reduce positioning latency.

Here, it is assumed that the Base Station (BS) location and its antenna array orientation is known both at the BS and the UE via signalling.

Case 1

AoA can be measured at more than one gNB to locate the UE as shown in FIG. 5. Assuming horizontal antenna array orientation at both gNBs, θ1 and θ2 (the respective angle of arrival) can be measured at each gNB based on the signal transmitted from the UE. Such a signal can be a reference signal such as SRS, DMRS, PTRS and PRACH or a data transmission. There is a need for both gNBs to exchange their AoA information so that the location of UE can be calculated. Alternatively, one or more gNB(s) may inform the other gNB(s) such that one gNB is responsible for calculating the UE location. A means of designating one gNB as being responsible for the calculation may be provided.

In such a case, at least two gNBs are needed but more gNBs can improve the positioning accuracy. It should also be noted that it is not necessary to measure AoA at gNBs but a logical or physical node can be defined and co-located with gNB for AoA measurements, similar to location measurement unit (LMU) in LTE. This approach is network based.

Case 2

Another approach is a UE-based positioning approach that is based on Angle of Departure (AoD) from the gNB. AoD is known to the gNB because the beam pattern and direction are determined by the precoding matrix which is known to the gNB and, as such, AoD can be derived from such information. The gNB can send AoD, its own location and antenna array orientation information via upper layer protocol, e.g., LPP, together with its reference signal or data transmission to the UE. Once the UE receives such information, it can calculate its own location and send back its location to the network. The reference signal used for this purpose by the gNB can be CSI-RS/TRS, DMRS, PTRS or SS. It should be noted that the UE needs to identify from which gNB a reference signal is received.

Case 3

AoA can also be measured at the UE with more antenna elements implemented for 5G user terminal. However, since UE can move and rotate, the UE might not know the orientation of its own antenna array, as shown in FIG. 6. Here UE orientation φ1 is unknown to the UE and assuming UE location is (x,y) there are three unknown values φ1, x and y in total. For every gNB transmission, one equation can be obtained as follows. In order to solve all three unknown values, three equations are needed so that at least three gNBs are needed for this approach. The reference signal for such AoA measurement can be CSI-RS/TRS, DMRS, SS or PTRS.

$$\tan(\pi - \theta1 - \varphi1) = \frac{y}{x}$$

In order to determine the AoD from the gNB, the UE needs a reference direction, e.g., north. Essentially, if the UE orientation is unknown, the UE has no idea which direction the reference direction is and therefore the AoD information is useless.

As shown in FIG. 7, it should be noted that with UE 700 orientation, the coordinate system is rotated by φ1. Therefore, for the first gNB 10, we can form the equation $$\tan(\pi - \theta1 - \varphi1) = \frac{y}{x}$$

Then for the second gNB 20, we can form another equation $$\tan(\theta2 + \varphi1) = \frac{y}{x}$$

If we have a third gNB, we can also form the third equation. With three equations, it is possible to solve three unknown variables x, y and φ1. Here φ1 is not measured but treated as an unknown variable. Therefore, there is no need to measure φ1.

In another example, φ1 can be measured by gyroscope, which is typically installed in many mobile devices and which can be used to measure φ1. This is illustrated in the right-hand portion of FIG. 7, which shows two gNBs 30, 40 and UE 710.

In this, there is no need to have three gNBs, and measuring AoD from two gNBs 30, 40 is sufficient.

UE orientation can be detected by the gyroscope in the UE as detailed later.

FIG. 8 shows a flow chart associated with the technique described above. Flow begins at S10. At S20, a determination is made whether the UE includes an installed gyroscope which may be used to determine UE orientation. If such a gyroscope is installed, then at step S30, the UE orientation is measured using the gyroscope. Then at step S40, AoD is measured from at least two gNBs and at step S60, the UE is located according to these measurements.

At step S20 if there is no gyroscope installed, then at step S50, AoD is measured from at least three gNBs and at step S60, the UE is located according to these measurements.

Case 4

Another approach is a network-based positioning approach that is based on AoD from the UE. UE can send AoD information via an upper layer protocol, e.g., LPP, together with its reference signal or data transmission to the gNB and once the gNBs get such information, they can calculate UE location. Alternatively, one or more gNB(s) may inform the other gNB(s) such that one gNB is responsible for calculating the UE location. A means of designating one gNB as being responsible for the calculation may be provided.

The reference signal used for such purpose can be SRS, DMRS, PTRS or PRACH. Multiple transmissions are needed and they can either occur simultaneously via multiple beams or in TDM mode. In the latter case, there is a need for gNBs to exchange the AoD information so that the location of UE can be calculated.

Angle-based positioning requires beamforming. However, even though the positioning happens when RRC is connected so that the UE is covered, the UE is moving so that it is possible for the UE to move out of the coverage and lose the RRC connection. It is preferable to have a wider beam to ensure the UE is in coverage in the case of emergency. Beam width adaptation configured by upper layer signaling for positioning should be supported and the adaptation criteria can be UE velocity, emergency level of positioning request, priority of positioning request, etc.

It is normally assumed that only narrow beams are used for angle-based positioning. Therefore, positioning measurements are based on assuming the beam centre. There may be some ambiguity but if have multiple gNBs are used, the positioning is sufficiently accurate.

In the angle-based positioning embodiments mentioned above, a Line of Sight (LOS) link is assumed. However, it is not always possible to have a LOS link between the gNB and the UE. In such cases, other measurements are needed for positioning.

Case 1: Angle+Signal Strength (RSRP/RSRQ/SINR)

When a non-LOS (NLOS) link between gNB1 200 and UE 220 is considered as shown in FIG. 9, in addition to the UE 920 location, a reflector 910 (e.g. a building or other structure) location is also unknown. In total, there are 5 unknown values including UE location (x,y), reflector location (x1,y1) and UE orientation. If only AoA or AoD at one side (i.e. at gNB 900 or UE 920) is measured, it is clearly not possible to form enough equations to be solved to locate the UE 220.

Here signal strength in terms of RSRP, RSRQ or SINR and such information together with path loss information can be used to estimate the path length of the signal traveled from the gNB to the UE or the other way around. Without channel reciprocity, it is necessary to know AoD at the network side, AoA at the UE side and signal strength at the UE side to form three equations for each NLOS path. With one additional NLOS path, there are two more unknown variables for a new reflector but three more equations can be formed. Assuming an NLOS path L, L needs to meet the following condition:

$$5+2*(L-1)<=3*L$$

and the minimum L is 3, which means at least 3 NLOS paths are needed to locate the UE.

When channel reciprocity holds, instead of measuring AoA at one side and AoD at another side, it is possible to measure AoA/AoD at both sides and then share such information to the other side via upper layer signaling, e.g., LPP, to locate the UE. In order to have at least 3 NLOS path, two options can be considered:

simultaneous multiple beams or wide beams with simultaneous multiple NLOS path;

TDM beams.

For the first option, the reference signal which can be used for DL can be CSI-RS/TRS, DMRS, SS, PTRS and for UL, it can be SRS, DMRS, PTRS, and PRACH. If multiple beams are used, either in SDM mode in the first option or TDM mode in the second option, beam index should be indicated so that there is one to one mapping between these beams and individual AoA/AoD pair values. If wide beam with simultaneous multiple NLOS path is used, AoA/AoD values can be sorted and paired with each other.

For NLOS, it is necessary to know the location of the reflector. The location of each reflector brings two unknown variables. At the same time, as mentioned, it is possible to form equations based on the measurement results. If the number of equations is larger than the number of unknown variables, the unknown variables can be solved and this situation provides sufficient enough information.

The obstacle position should be known because it is necessary to use it to calculate the AoA and length of the path that the signal has travelled since with obstacles, the AoA and length of the path are changed from LOS case. This information can then be used to locate the UE.

It should be noted that the signal strength may vary based on surface material but assumptions can be made of the reflection rate and then take that into consideration when measuring signal strength. This is not an ideal solution, but provides a sound working technique in practice.

It should be noted that there might be multiple obstacles. However, the most common case is that the signal is only reflected once in any given path and this is the case considered here. If the signal is reflected by more than one obstacle in a given path, then the UE may not be located by use of an embodiment of the invention.

In the following case, it is assumed that $\varphi 1$ is 0 for simplicity. If $\varphi 1$ is not zero, the aforementioned method can be used.

FIG. 10 shows a situation with two separate reflectors, such a signal from gNB1 1000 arrives at the UE 1020 having been reflected from reflector1 1010 and separate reflected from reflector2 1015. The following definitions are used in the following:

gNB1 location (x0,y0)=(0,0)
Reflector1 location (x1,y1)
Reflector2 location (x2,y2)
UE location (x,y)

From these, it is possible to form the following equations:

$$\tan(\theta 1 - \pi) = \frac{y1}{x1}$$

$$\tan(\theta 2) = \frac{x1 - x}{y1 - y}$$

The length of the path that the signal travels=(x1^2±y1^2)^0.5+((x1-x)^2+(y1-y)^2)^0.5, with signal strength and pathloss model, another equation can be defined. Signal strength=pathloss(Length of the path signal travels)

So in total, there are three equations. With reflector 2, it is possible to form three equations in a similar way but with two unknown variables x2 and y2. So in total, there are 6 unknown variables and 6 equations. Therefore, the unknown variables can be solved.

Case 2: Angle+Timing Advance/Round Trip Time (RTT)

Here the principle is the same as case 1, above, but signal strength is replaced by timing advance which can be used to derive RTT as well as the distance between gNB and UE. With such information, the same approach as in case 1 can be used.

Case 3: Angle+Arrival Time Difference

In this case, the arrival time difference can be combined with angle-based positioning. For each additional NLOS link, arrival time difference provides one more equation in addition to AoA/AoD. Assuming L NLOS path, L needs to meet the following condition $$5+2*(L-1)<=2+3*(L-1)$$

Here L should be at least 4, which means 4 paths are needed for positioning. For arrival time difference measurement, CSI-RS/TRS, SS and PRS can be considered in DL and SRS, PRACH and DMRS can be considered for UL.

It should be noted that the required L path can come from either the same gNB or different gNBs. The AoA/AoD information can be shared via upper layer signaling, e.g., LPP/LPPa. It should also be noted that LOS is a special case of NLOS so it is possible that within the L path, there is a LOS path.

RAT-dependent positioning can also be combined with RAT-independent positioning approaches to improve accuracy or reduce latency and complexity. In previous cases, the UE orientation is unknown. However, with assistance from RAT-independent positioning technique, e.g., gyroscope as referred to previously, the UE orientation can be known. In this case, the number of unknown variables is reduced. For Case 1, Angle+signal strength (RSRP/RSRQ/SINR), the required number of NLOS links is reduced to 2 and for Case 2, Angle+arrival time difference, the required number of NLOS links is reduced to 3. The UE orientation information may be shared via upper layer signaling, e.g., LPP/LPPa.

The accuracy of angle measurement and arrival time difference depend on number of antenna elements and bandwidth, respectively. A UE might have different capability to support certain number of active antenna elements for certain bandwidth. In this regard, the UE needs to report its capability to the gNB so that the gNB knows if angle-based positioning is possible at the UE side. The gNB can also know the accuracy for time different measurement at the UE if UE reports back its maximum supported bandwidth. Basically, the UE should report back the gNB and location server its antenna and supported bandwidth related information and location server can therefore determine which positioning scheme is the most appropriate one.

When positioning reference signals are configured, it can be TDM and/or FDM from multiple Transmission Points (TPs). However, Code Division Multiplexing (CDM) can also be supported to reduce signaling overhead. In such a case, the time difference accuracy requirements are different from TDM and FDM and a UE should report if it can support CDM of positioning reference signals.

Another issue is the confidence of positioning that should be reported either by the UE or by the gNB to the location server. The confidence reflects how accurate the positioning measurement is expected to be and it depends on multiple factors, such as signal strength of the positioning signals (e.g., RSRP/RSRQ/SINR of positioning reference signals) or variance of signal strength, number of antenna elements (e.g., for angle based measurement), and the number of nodes involved in positioning measurements. These metrics can also be shared between network and UE with positioning measurement results. The following options are available for reporting such metrics.

All metrics need to be reported by the entity conducting the measurement. For network-based approach, the UE makes the report and for UE-based approach, the network can report such metrics;

A subset of these metrics is reported based on upper layer configuration and this subset can be modified by upper layer configuration as well.

It should be noted that the metrics themselves can be reported with different timing granularity depending on the requirements. For example, signal strength reporting requires regular and relatively frequent reporting but the number of nodes involved in positioning measurements can be much less frequent.

As aforementioned, the following measurements are performed to support positioning in NR.

AoA
AoD
Arrival time
Arrival time difference
Signal strength

Signal strength measurement has been defined in NR using CSI-RS or SS and it can be easily extended to other reference signals used for positioning. AoD can be obtained by analyzing the precoding matrix or measuring AoD when channel reciprocity holds.

For AoA, the following measurement is defined.

| | |
|---|---|
| Definition | AoA defines the estimated angle of a user or network node, e.g., gNB with respect to a reference direction. The reference direction for this measurement shall be the geographical North, positive in a counter-clockwise direction. The AoA is determined at the gNB antenna for an UL channel corresponding to this UE or a the UE antenna for an DL channel corresponding to transmitting gNB. |

For arrival time difference (Reference signal time difference (RSTD)), the following measurement needs to be defined.

| | |
|---|---|
| Definition | The relative timing difference between the neighbour cell j and the reference cell i, defined as $T_{slotRxj} - T_{slotRxi}$, where: $T_{slotRxj}$ is the time when the UE receives the start of one slot from cell j $T_{SubframeRxi}$ is the time when the UE receives the corresponding start of one slot from cell i that is closest in time to the slot received from cell j. The reference point for the observed slot time difference shall be the antenna connector of the UE. |
| Applicable for | RRC_CONNECTED intra-frequency<br>RRC_CONNECTED inter-frequency<br>RRC_INACTIVE intra-frequency<br>RRC_INACTIVE inter-frequency<br>RRC_IDLE intra-frequency only applicable for NB-IoT UEs<br>RRC_IDLE inter-frequency only applicable for NB-IoT UEs |

For arrival time, the following measurement needs to be defined.

| | |
|---|---|
| Definition | The timing between NR cell j and a reference time, e.g., GNSS specific reference time for a given GNSS (e.g., GPS/Galileo/Glonass system time). $T_{UE-Rxj}$ is defined as the time of occurrence of a specified NG-RAN event according to the reference time, e.g., GNSS time, for a given cell Id. |
| Applicable for | RRC_CONNECTED |

Some of the techniques require joint measurements of angle and RSRP, angel and timing advance, and angle and arrival time difference. Some joint measurement can be defined by combining above definitions.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication network, the method comprising:
   receiving information for an angle of departure (AoD) positioning method, the information including beam direction information for each of multiple nodes and location information of each of the multiple nodes;
   receiving, from the multiple nodes, downlink reference signals of the multiple nodes;
   determining a position of the UE based on the information for the AoD positioning method and reference signal received power (RSRP) measurements of the downlink reference signals; and
   transmitting, to a location server, information of the position of the UE and confidence information associated with an accuracy,
   wherein the beam direction information includes information for an angle associated with a reference direction being a geographical north, and
   wherein capability information for the AoD positioning method is transmitted to the location server, the capability information including information on a maximum supported bandwidth.

2. The method of claim 1, wherein the position of the UE is determined further based on at least one sensor including a gyroscope.

3. The method of claim 1, wherein the multiple nodes are associated with a next generation node B (gNB).

4. The method of claim 1, wherein information is received based on a sidelink positioning protocol (SLPP).

5. The method of claim 1, wherein position of the UE is determined based on a radio access technology (RAT) dependent positioning using the downlink reference signals and a RAT-independent positioning using a global positioning system (GPS).

6. A user equipment (UE) in a wireless communication network, the UE comprising:
   at least one transceiver; and
   at least one processor coupled to the at least one transceiver, the processor configured to:
      receive information for an angle of departure (AoD) positioning method, the information including beam direction information for each of multiple nodes and location information of each of the multiple nodes,
      receive, from the multiple nodes, downlink reference signals of the multiple nodes,
      determine a position of the UE based on the information for the AoD positioning method and reference signal received power (RSRP) measurements of the downlink reference signals, and transmit, to a location server, information of the position of the UE and confidence information associated with an accuracy,
wherein the beam direction information includes information for an angle associated with a reference direction being a geographical north, and
wherein capability information for the AoD positioning method is received from the UE, the capability information including information on a maximum supported bandwidth.

* * * * *